United States Patent [19]

Ishihara et al.

[11] Patent Number: 4,572,641
[45] Date of Patent: Feb. 25, 1986

[54] LATCH DEVICE FOR CARTRIDGE COMPARTMENT DOOR OF A CAMERA

[75] Inventors: Kazuo Ishihara, Toyokawa; Haruo Kobayashi, Sakai, both of Japan

[73] Assignee: Minolta Camera Kabushiki Kaisha, Osaka, Japan

[21] Appl. No.: 546,141

[22] Filed: Oct. 27, 1983

[30] Foreign Application Priority Data

Nov. 6, 1982 [JP] Japan .......................... 57-168548[U]

[51] Int. Cl.[4] .............................................. G03B 1/00
[52] U.S. Cl. ..................................... 354/121; 354/288
[58] Field of Search ................ 354/121, 288, 202, 219

[56] References Cited

U.S. PATENT DOCUMENTS

| | | | |
|---|---|---|---|
| 3,240,107 | 3/1966 | Prister | 354/219 |
| 4,268,145 | 5/1981 | Harvey et al. | 354/121 |
| 4,449,806 | 5/1984 | Wong et al. | 354/121 |

OTHER PUBLICATIONS

Hinkle, R. T., *Kinematics of Machines*, Prentice-Hall, Inc., Englewood Cliffs, N.J., 1960, p. 237.
"Research Disclosure", No. 15156, pp. 49, 50, 11/1976, Disclosed by Arno Ebner.
"Research Disclosure", No. 22436, pp. 404–407, 12/1982.

Red Ink Sketch prepared of Kodak Disc 4000 Camera Construction.

*Primary Examiner*—John Gonzales
*Attorney, Agent, or Firm*—Wolder, Gross & Yavner

[57] ABSTRACT

A thin vertically disposed camera adapted for use with a disk type film contained cartridge includes latch device for catching a compartment door at its closed position and rotatably supported connecting member to be connected to a cover member of the cartridge loaded in the camera for moving the cover member between an exposure window opening position and an exposure window closing position. The latch device includes a manually operable portion movable between a locking position for enabling the latch device to catch the compartment door and a releasing position for disabling the latch device. The rotation of the manually operable member from its releasing to locking position is same in the direction as the rotation of the connecting member for moving the cover member from its exposure window closing position to the exposure window opening position. A motion transmitting mechanism is provided in the camera for transmitting the rotation of said manually operable member to the connecting member.

The motion transmitting mechanism consists of a couple of gear portions respectively provided on the latch member and the connecting member and a rotatably supported gear meshing with both gear portion.

5 Claims, 5 Drawing Figures

LATCH DEVICE FOR CARTRIDGE COMPARTMENT DOOR OF A CAMERA

BACKGROUND OF THE INVENTION

1. Field of the Invention

The present invention relates to an improvement of the latch device for the cartridge compartment door of a camera used with a disk type cartridge assembly.

2. Description of the Prior Art

The disk type film cartridge assemblies which are presently on market have an exposure window as shown in a U.S. Pat. No. 4,268,145 and also have a cover member inside of the cartridge which cover member is rotatable for closing said exposure window to prevent the film from being exposed to the light through said exposure window when the cartridge assembly is not loaded in the camera. The cover member is normally locked at the position to cover the exposure window. But, when the cartridge assembly is received in the camera, the lock is released and the cover member is opened by the rotation in the clockwise direction as viewed from the side of cartridge assembly on which the exposure window is provided.

On the other hand, the known cameras used with such a disk type film cartridge assembly are designed to move the cover member to the closing or opening position and to release or lock the latch for the cartridge compartment door at the closing position by the linked motion caused by operation of the same member. And in those cameras, before the lock of the cartridge compartment door at the closing position is released, a driving member which drives the cover member is actuated to move the cover member in the cartridge to the exposure window closing position and the exposure window will always be closed when the cartridge assembly is taken out from the camera. In the conventional cameras, the taking lens is disposed to the right of the camera housing as viewed from the front of the camera housing, and the locking member provided for moving the cover member to the open or closed position and for locking and releasing the cartridge compartment door at its closing position is pivotably mounted at an upper part of the camera housing and by a pin or rod extending substantially in parallel with the optical axis of the taking lens. The cartridge compartment door is designed to be locked at the locking position when the locking member is rotated in the counterclockwise direction. The locking member at such locking condition will be in parallel with the top surface of the camera housing and be close to of or directly contacting with the top of the camera. Should the locking member be rotated approximately 90 degrees in the clockwise direction from that position as viewed from the front of the taking lens, the exposure window of the cartridge will be closed and simultaneously the lock of cartridge compartment door at its closing position will be released.

Also, the moving directions of the cover member inside of the cartridge when the cover member opens and closes the exposure window is predetermined depending upon the types of the disk type film cartridge assembly to be used.

And when the disk type film cartridge assembly is loaded a camera, the exposure window is to be opened by the clockwise rotation, as viewed from the front of the taking lens, of the cover member. Consequently, it is necessary that the cover member connecting member which operates both the locking member and the cover member connects either directly through the gear portions of the locking member and the cover member or via the gears of an even number between them. In conventional cameras two gears are interposed. This is becase if the gear portions of the locking member and the cover member connecting member should be connected directly, at least either one of the members may require a considerably large space during the opening and closing operation, resulting in restriction of the versatility of the design of other mechanisms. In order to prevent such inconvenience, the gears are provided between the two members. In such an arrangement of the conventional camera the operating power is conveyed via two gears and two gear portions resulting in the lowering of power conveying efficiency and higher costs.

Also, another shortcoming of the above mentioned conventional camera is that there is some difficulties in operating the locking member because a photographer may find it difficult to lift the locking member by looking the tip of the locking member with his or her finger since the locking member will be positioned alongside the top plane of the camera housing and especially the tip of the locking member will fall into the concave portion formed on the top plane of the camera housing when the locking member is brought down.

SUMMARY OF THE INVENTION

An object of the present invention is to provide an improved latch or locking device for locking the cartridge compartment door at the locking position in the cameras used with the disk type film cartridge assemblies.

Another object of the invention is to provide a locking device which will be low in cost and has a high efficiency of transmission due to simplification of the driving power conveying mechanism from the locking member to the cover member connecting member for opening and closing the cover member of the cartridge assembly.

Still another object of the invention is to provide a locking device with excellent maneuverability with which there is no possibility of the locking member being activated inadvertently when it was brought down to the locking position while when a user attempts to operate the locking member he can do it with ease since it is easy for him to catch the locking member with his fingertips.

DETAILED DESCRIPTION OF THE PREFERRED EMBODIMENTS

Figure 1:
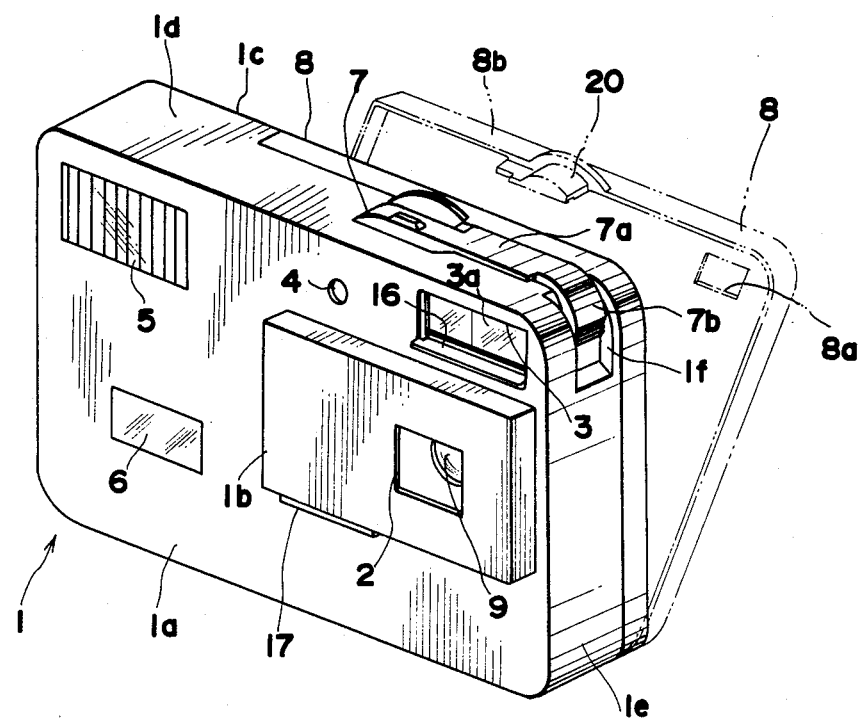
FIG. 1 is a perspective view of the outer appearance of a camera provided with a locking device according to an embodiment of the present invention.
Figure 2:
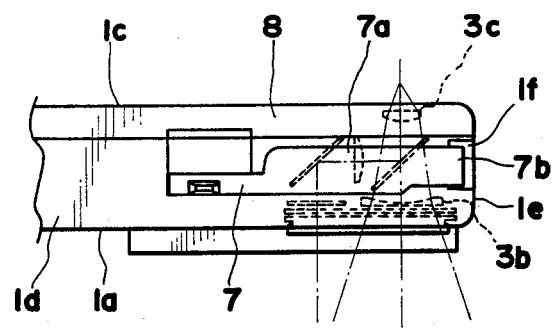
FIG. 2 is a partial plane view of the camera illustrated in FIG. 1.

In FIG. 1, reference numeral 1 denotes a camera used with a disk type film cartridge and numeral 2 denotes a taking lens window formed on projecting wall 1b of front flat plane 1a of camera 1. Taking lens 9 is installed behind the taking lens window. A taking lens for close-up shooting is installed inside projecting wall 1b and it is movable between the position located on the optical axis of taking lens 9 and the position retracted from the optical axis of the taking lens by slidingly operating a close-up setting member 17. Numeral 3 denotes a viewfinder window formed above taking lens window 2 and at the upper right corner of the front flat plane. Cover member operating portion 16 projects to the front of the camera, extends through viewfinder window 3 and is movable up and down along the short side of viewfinder window 3. When cover member operating portion 16 is moved upward from the position illustrated in FIG. 1, a dust-proof covering member (not shown) which is integral with the cover member operating portion will close viewfinder window 3 and taking lens window 2. Numeral 4 denotes a photocell window for measuring light and numeral 5 denotes the light emitting portion of a flash device arranged at the upper left corner of the front flat plane 1a which is opposite from viewfinder window 3. Numeral 6 denotes a release button disposed below the light emitting portion of the flash device on front flat plane 1a. It will be noted that a capacitor (not shown) for the flash device is installed at the back of light emitting portion and a battery (not shown) for the motor of a film windup mechanism, the flash device and an exposure control circuit is accommodated at the back of release button 6. Since a considerable amount of space is used to accommodate those capacitor and battery at the left side of the camera housing, the taking lens is installed at the right side of the camera housing. Numeral 7 denotes a locking member for locking cartridge compartment door 8 at the closing position. The lock of cartridge compartment door 8 at the closing position is released by manually lifting lever section 7a of locking member 7. Then door 8 is allowed to open. Locking member 7 is at the top of camera 1 supported by a pin or rod extending in parallel with the taking lens optical axis and is biased by a spring (not shown) in the clockwise direction as viewd from the front of the camera. Locking member 7 may be rotated by the predetermined degree in the counterclockwise direction against the force of said spring to release the lock of cartridge compartment door 8 at the closing position. When cartridge compartment door 8 is closed, locking member 7 automatically rotates in the clockwise direction under the force of the biasing spring to fall down onto camera top plane 1d. When locking member 7 is positioned at the locking position as illustrated, the bend portion 7b formed at its tip will fit into recess 1f formed at the right corner of the camera housing. It will be noted that recess 1f is formed in such a way that the camera side 1e is retracted towards the internal of camera 1 along the portion from the upper plane 1d of camera to the side 1e of the same. As shown in FIG. 2, in the viewfinder optical system of camera 1 in accordance with the present invention, eyepiece lens 3c having a positive power is smaller in size as compared with objective lens 3b having a negative power and a space which is not used for a viewfinder light pass exists between the lenses mentioned above. The recess 1f is formed utilizing this space. The cartridge compartment door 8 is connected to the rear part of camera housing 1 to open and close. An eyepiece window 8a for the viewfinding is formed at the position which opposes the rear part of viewfinder section 3a of camera 1 when cartridge compartment door 8 is closed. Also, at the nearly center of the top side 8b of cartridge compartment door 8, a projection 20 is formed integrally with said top side 8b to engage locking member 7.

Figure 3:
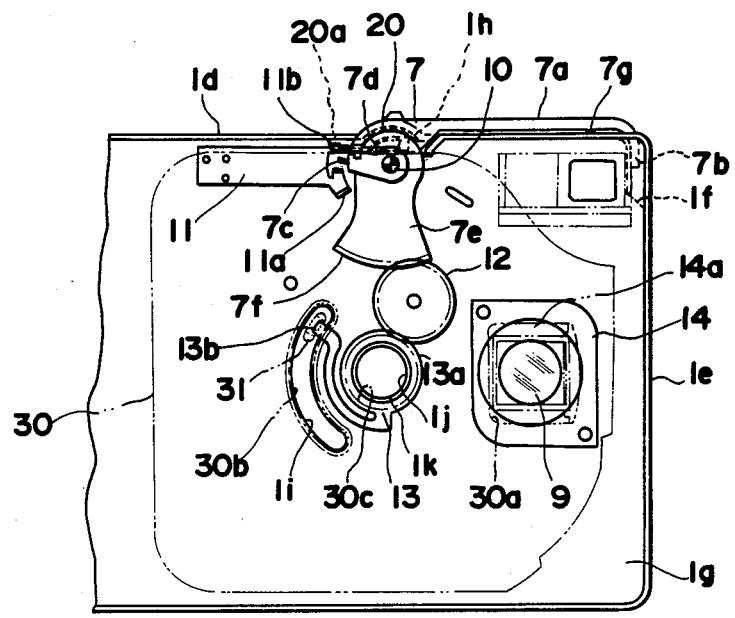
FIG. 3 is a front view of the camera showing the sectional views of principal parts of the camera illustrated in FIG. 1.
Figure 4:
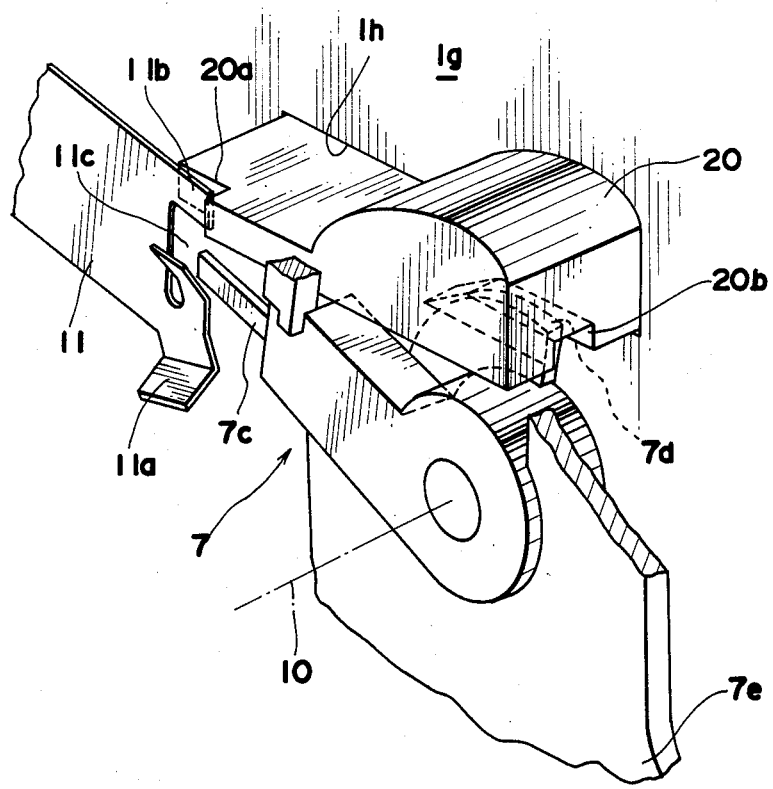
FIG. 4 is a perspective view of the camera showing, in an enlarged scale, only its principal parts of the embodiment of the invention illustrated in FIG. 1.
Figure 5:
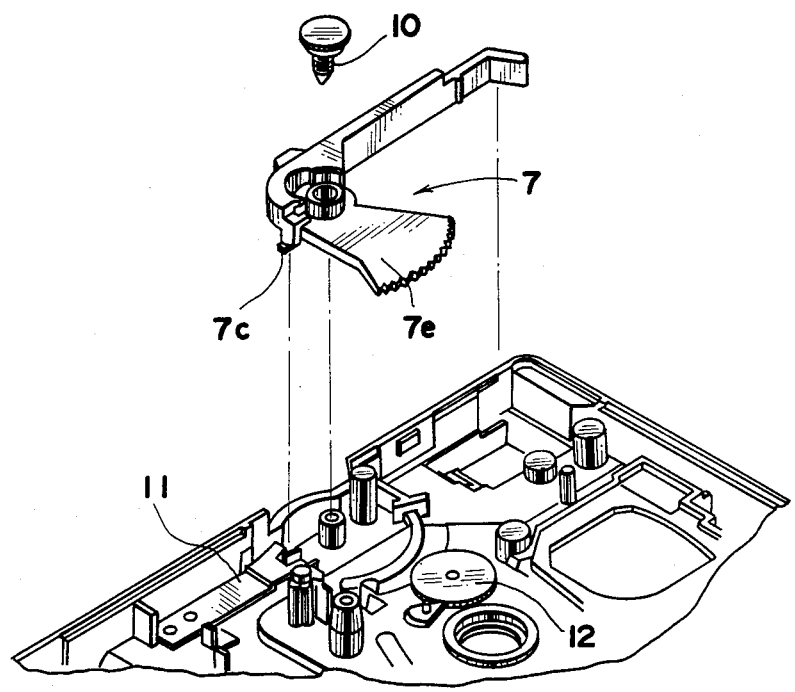
FIG. 5 is an exploded perspective view of the camera showing the principal parts of the embodiment illustrated in FIG. 1.

As shown in FIG. 3 and FIG. 5, locking member 7 is pivotably mounted at the top of the camera by pin 10 which extends in parallel with the optical axis of taking lens 9. Engaging portion 7c, projecting sector 7d (see FIG. 4) and gear portion 7e are integrally formed at the base of locking member 7. Also, an elastic locking plate 11 is fixed within camera 1 and extends such that its plane is normal to the optical axis of taking lens 9. Bend portion 11a formed at a portion of plate 11 lies within the rotatable track of engaging section 7c of locking member 7 to lock engaging portion 7c and retain locking member 7 at the lock releasing position. Also, an intermediate gear 12 engages gear 7f formed at on gear portion 7e and gear portion 13a of cover member connecting member 13 engages intermediate gear 12. Further, a branch extends outwards from cover member connecting member 13 and the tip of the branch is formed with a bent portion which extends through an arcuate slot 1i formed on base plate 1g of the cartridge compartment and projects into the cartridge chamber.

When locking member 7 is rotated in the counter clockwise direction to release cartridge compartment door 8, its engaging section 7c will move out of notch 11c at the tip of the elastic locking plate and passes over the tip portion of elastic locking plate 11 pushing aside from tip from its back and arrives at the position where it engages bent portion 11a. At this position, the rotation of locking member 7 in the clockwise direction by the spring (not shown) is inhibited by the engagement of engaging section 7c with bend 11a. When the disk type film cartridge is loaded into the compartment and the cartridge compartment door is closed, projection 20 integrally provided on cartridge compartment door 8, at first, projects into inside of the camera housing after extending through opening 1h formed on cartridge compartment base plate 1g. Then, stepped portion 20a of locking projection 20 pushes contacting section 11b of elastic locking plate 11 until said contacting section 11b is bent. This will allow bend 11a of elastic locking plate 11 to retract from the rotational track of engaging portion 7c of locking member 7 thereby releasing engaging portion 7c being hooked. Accordingly, lock member 7 is rotated by the biasing force of the spring (not shown) in the clockwise direction. When locking member 7 starts rotating, a projecting sector 7d which is integrally formed with said locking member 7 will immediately drop into the engaging slot 20b formed at the bottom of locking projection 20 whereby locking projection 20 is restrained to inhibit the movement of cartridge compartment door 8 toward the opening direction so that cartridge compartment door 8 is locked at the closing conditions. When locking member 7 is rotated in the clockwise direction, intermediate gear 12 engaging gear 7f of gear portion 7e will rotate in the counterclockwise direction and in addition, cover member connecting member 13 engaging with intermediate gear 12 will rotate in the clockwise direction. As disclosed in the U.S. Pat. No. 4,218,145, the disk type film cartridge is formed, on the same side as exposure window 30a, arcuate slot 30b and central opening 30c of which receives the film driving member of the camera. A fork-shaped projection 31 formed integrally with the cover member which is incorporated in disk type film cartridge for covering exposure window 30a is located within circular arc opening 30b. When disk type film cartridge 30 is received in the cartridge compartment, fork-shaped projection 31 engages curved section 13b of cover member connecting member 13. When cover member connecting member 13 is rotated in the clockwise direction, projecting sector 31 is pushed to be rotated, and the cover member will move away from exposure window 30a for opening said exposure window 30a. Then locking member 7 is rotated in the clockwise directon until projection 7g formed at the bottom of the locking member comes into direct contact with the upper side 1d of camera. At this time, locking member 7 lies substantially in parallel with the top side 1d of camera and its tip portion 7b which is bent approximately 90 degrees downward of the camera will fit into and be received by recess 1f formed from the upper side 1d of the camera to the side 1e of camera. Thus, cartridge compartment door 8 is locked under the conditions in which tip portion 7b of locking member 7 is positioned within the contour of the side face 1e of camera, so that the structure can prevent inadvertent opening of cartridge compartment door 8 by, for example, clothes that may catch tip portion 7b and cause unintended releasing of locking member. It will be noted that recess 1f is formed to extend downwards longer than tip portion 7b received therein. This is facilitate the catching of tip portion 7b with the fingertip of the user attempting to release the locking.

When disk type film cartridge 30 is taken out from camera 1, the fingertip of the user may be put into recess 1f at the side face 1e of camera under the conditions as illustrated in FIG. 3 and locking member 7 may be rotated in the counterclockwise direction with tip portion 7b of locking member 7 being catched. The rotation of locking member 7 will cause gear section 7e to rotate in the counterclockwise direction resulting in the rotation of intermediate gear 12 and cover member connecting member 13 in the clockwise and in the counterclockwise directions respectively. The counterclockwise rotation of cover member connecting member 13 will cause projecting sector 31 of the cartridge which is in engagement with bent portion 13b of connecting member 13, to rotate in counterclockwise direction resulting in the closure of exposure window 30a with cover member. When locking member 7 is rotated further in the counterclockwise direction after exposure window 30a has been closed, projecting sector 7d will disengage from engaging slot 20b at the bottom of locking projection 20. Whereupon, cartridge compartment door 8s is automatically pushed out to the opening direction since locking projection 20 is received the biasing force of elastic locking plate 11 at its stepped portion 20a. At this status, it is possible to take out the film cartridge assembly from the camera.

On the other hand, following the counterclockwise rotation of locking member 7, locking portion 7c which is integral with the locking member will rotate in the counterclockwise direction from the position of notch 11c at the tip of the elastic locking plate. In the way, locking portion 7c comes into contact with the back surface of the tip portion of elastic locking plate and arrives at the position just below bend 11a, pushing aside the tip portion. When locking section 7c arrived at the position just below bend 11a, the pressure to the elastic locking plate 11 by locking projection 20 has already been released and bend 11a restored within the rotating track of engaging portion 7c of the locking member. Locking member 7 is held at the ejected position against the biasing force of the spring (not shown) since the rotation of locking member 7 in the clockwise direction is restricted by the engagement between engaging portion 7c and bend 11a.

It will be noted in FIG. 3 numeral 14 denotes the taking lens block with an exposure window defining frame 14a. Exposure window defining frame 14a projects into the cartridge compartment and extends into exposure window 30a formed on said cartridge 30 to be in contact with the film plane when disk type film cartridge 30 is received in the cartridge compartment. Opening 1j formed on the base plate 1g of cartridge compartment corresponds to central opening 30 formed on disk type film cartridge 30. When cartridge assembly 30 is loaded in the camera, the known disk type film driving shaft (not shown) which extends through the opening 1j from inside of the camera housing and projects into the cartridge compartment will engage the disk type film and rotate for feeding the film. Numeral 1k denotes a rib section formed around opening 1j, and serves as a bearing for the aforementioned cover member connecting member 13.

According to the present invention so far described, the cameras adapted for use with the disk type film cartridge is constructed such that the lock member is operated in the opposite directions as compared with the case of conventional cameras, for the locking of the cartridge compartment door at the closing position and releasing of the same and for opening and closing the cover member which is adapted to cover the exposure window of the disk type film cartridge. This could result in reduction of the numer of gears, requiring a single intermediate gear in the transmission that convey the operating power from the lock member to the cover member connecting member which operates the cover member. Thus, efficiency of power transmission is risen and the cost of manufacture is lowered.

Another advantage of the present invention is that a recess for receiving the tip portion of the lock member is formed in the vicinity of the viewfinder from the top side to side face of the camera, utilizing the space that is not used for the light path of a viewfinder optical system. This could prevent the inadvertent opening of the cartridge compartment door due to unintended operation of lock member and also afford an easy handling of the locking member allowing insertion of user's fingertip into the said recess portion.

What is claimed is:

1. A thin vertically disposed camera for use with a disk type film cartridge having an exposure window and a cover member rotatable between a closed position in closing registry with said exposure window and an open position offset from said exposure window, said camera comprising:

a picture lens;

a housing having a relatively large vertical front wall to which the optical axis of said picture lens is perpendicular, a compartment for receiving therein said cartridge with its exposure window being in axial registry with said picture lens, a door for opening and closing said compartment and a recess provided at a corner delineated by the top wall and a lateral side wall of the camera;

a rotatably supported connecting member having an engaging portion extending into said compartment to be directly connected with said cover member of said cartridge loaded in said compartment, said connecting member being capable of rotating said cover member from its closed to open position when said connecting member is rotated in a predetermined direction;

an externally accessible operating member supported for rotation about an axis parallel to said optical axis so as to be rotatable between a locking position for catching said door at its closed position and a releasing position to release the catch of the door, said operating member being displaced with the rotation in said predetermined direction from its releasing to locking position;

a manually operable lever portion formed as a part of said operating member, said lever portion extending outwardly of the camera housing and being lifted when said operating member is in its releasing position but being depressed into said camera housing when said operating member is in its locking position;

a bent portion disposed on an end of said manually operable lever portion and lying along said corner when said lever portion is depressed into the camera housing, so that said bent portion is received in said recess and leaves a clearance to allow a finger tip to be inserted under the bent portion; and motion transmitting means for transmitting the rotation of said operating member to said connecting member, said motion transmitting means consisting of a couple of gear portions respectively provided on said operating member and connecting member and a gear member rotatably supported and meshing with said gear portions.

2. A camera as set forth in claim 1, further comprising a viewfinder optical system located at a position in close vicinity to said corner and wherein said viewfinder optical system includes an objective lens of negative power and an eyepiece lens of positive power and is smaller in size as compared with said objective lens so as to define a space between said corner and the optical path of said viewfinder optical system, and said recess is provided at said space.

3. A thin vertically disposed camera adapted for use with a disk type film contained cartridge, said camera comprising;

a housing of substantially flat rectangular parallelepiped configuration defined at least by a relatively large vertical front wall and a first and second side walls adjoining and perpendicular with each other, said housing having a compartment for receiving therein said cartridge and including a door hinged by an axis perpendicular to the optical axis of the picture lens;

a manually operable member rotatably supported by an axis parallel to the axis of the picture lens, said manually operable member being rotatable between a first position where said manually operable member is lifted from said first wall and a second portion where said manually operable member is falled down onto said first side wall and said manually operable member being provided at its tip end with a bent portion lying along a corner formed by said first and second side walls, said second wall having a recess for receiving therein said bent portion with leaving a clearance to allow a finger tip to be inserted therein; and means actuated for catching said door at its closing position, said means being interconnected with said manually operable member so as to be actuated when said manually operable member is rotated from its first to second position.

4. A camera as set forth in claim 3, wherein said first side wall includes a top side wall and said second side wall includes a vertical side wall.

5. A camera for use with a disk type film cartridge having an exposure window and a cover member rotatable between a closed position in closing registry with said exposure window and an open position offset from said exposure window, said camera comprising:

a picture lens;

a housing having a compartment for receiving therein said cartridge with its exposure window being in axial registry with said picture lens, a door for opening and closing said compartment and a recess provided at a corner delineated by a top wall and a lateral side wall of the camera;

a rotatably supported connecting member having an engaging portion extending into said compartment to be directly connected with said cover member of said cartridge located in said compartment, said connecting member being capable of rotating said cover member from its closed to open position when said connecting member is rotated in a predetermined direction;

an externally accessible operating member rotatably supported for rotation about an axis parallel to said optical axis so as to be rotated between a locking position for catching said door at its closed position and a releasing position to release the catch of the door, said operating member being displaced with the rotation in said predetermined direction from its releasing to locking position;

a manually operable lever portion formed as a part of said operating member, said lever portion extending outwardly of the housing and being raised when said operating member is in its releasing position but being lowered into said camera housing when said operating member is in its locking position;

a bent portion disposed on an end of said manually operable lever portion lying along said corner when said lever portion is lowered into the camera housing, so that said bent portion is received in said recess and leaves a clearance to allow a finger tip to be inserted under the bent portion; and motion transmitting means for transmitting the rotation of said operating member to said connecting member.

* * * * *